Feb. 8, 1949.  C. B. McCATHRON  2,461,499
VIEW FINDER FOR PHOTOGRAPHIC CAMERAS
Filed Nov. 16, 1946

INVENTOR.
Claude B. McCathron
BY
Emery, Booth, Townsend, Miller and Weidner
Attys.

Feb. 8, 1949.  C. B. McCATHRON  2,461,499
VIEW FINDER FOR PHOTOGRAPHIC CAMERAS
Filed Nov. 16, 1946  2 Sheets-Sheet 2
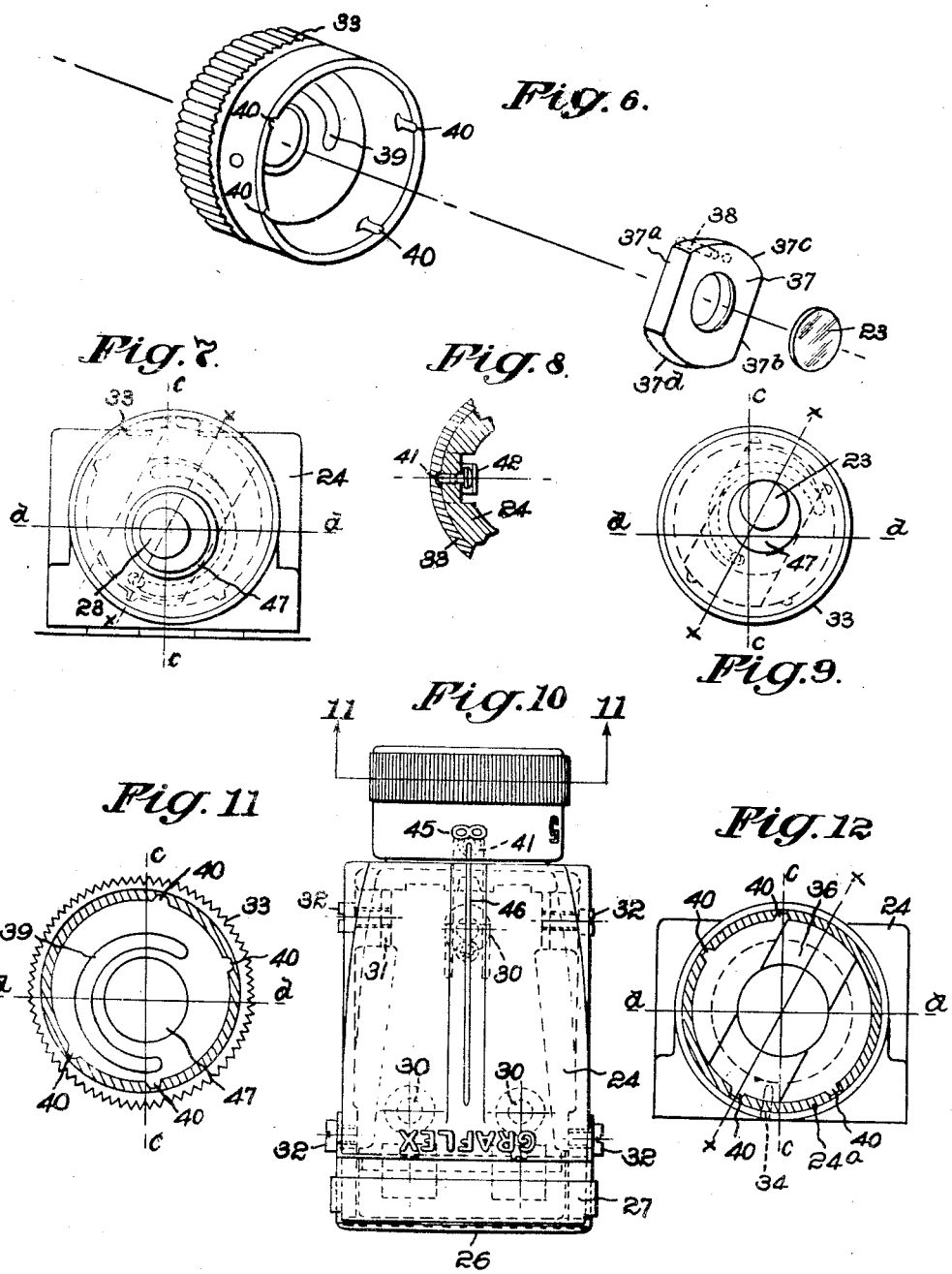
INVENTOR.
Claude B. McCathron Patented Feb. 8, 1949

2,461,499

UNITED STATES PATENT OFFICE 2,461,499

VIEW FINDER FOR PHOTOGRAPHIC CAMERAS

Claude B. McCathron, Rochester, N. Y., assignor to Graflex, Inc., Rochester, N. Y., a corporation of Delaware Application November 16, 1946, Serial No. 710,287

5 Claims. (Cl. 88—1.5)

This invention relates to a new and improved view finder for photographic cameras.

In order that the principle of the invention may be readily understood, I have disclosed a single embodiment thereof in the accompanying drawings, wherein—

Fig. 6 is an exploded view of the view finder adjusting member;

Fig. 7 is a right-hand end view of Fig. 2, showing the adjusting member in position for infinity correction;

Fig. 8 is a fragmentary vertical section through Fig. 2, taken on the line 8—8 thereof and showing the construction of the detent for holding the adjusting member in place;

Fig. 9 is a view similar to Fig. 3, the adjusting member being positioned for a six-foot correction;

Fig. 10 is a top plan view of the view finder;

Fig. 11 is a cross section through the adjusting member, taken on the line 11—11, Fig. 10, and showing the cam track and the several notches that are engaged by the detent for obtaining the several settings of the adjusting member; and Fig. 12 is a vertical section through Fig. 2 on the line 12—12 thereof.

The herein disclosed view finder is of the reversed Galilean type having novel means for adjusting the same to correct for camera and view finder parallax. It is well understood by photographers that it is highly desirable to have the view finder see the same picture area that is covered by the camera.

Since the view finder, when mounted on a camera, must in practice not only be mounted some distance away from the actual axis of the camera objective lens, but must also be displaced laterally with respect to a vertical plane passing through the axis of the said camera objective lens, means must be provided to adjust or rectify the angle of view of the view finder, so that the camera operator will in using the view finder see an image exactly as that image is actually covered by the camera.

The principal objects of this invention are: to provide a view finder that is substantial in construction and is simple to operate; to provide a view finder having a simple means for parallax correction; to provide parallax adjusting means that will remain in position after once set regardless of how much the camera is vibrated or jarred; and to provide a view finder having a simple cam controlled movement for making the correction for parallax. Other novel features will be apparent from the ensuing detailed description.

Figure 1:
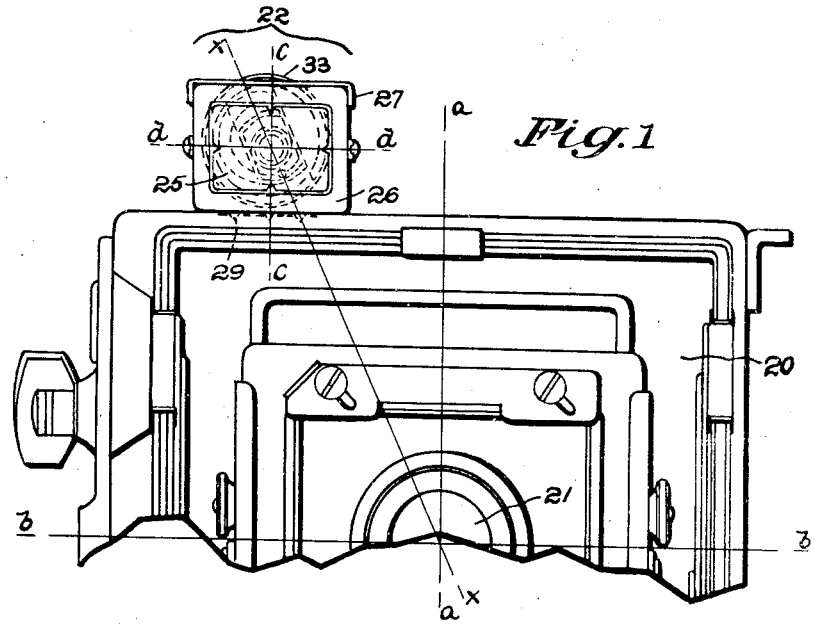
Fig. 1 is a front plan view of a camera having the lower part broken away and showing the mounting of the view finder with respect to both the vertical and horizontal axes of the camera objective lens.

Referring first to Fig. 1, a well known type of camera is indicated at 20. Thereon is shown a vertical center line, indicated as broken line a—a, which passes through the vertical center of the objective lens of the camera, and a horizontal center line, indicated as the broken line b—b which passes through the horizontal center line of the objective lens of the camera. The center lines a—a and b—b also indicate the center line of the sensitized material when the objective lens 21 is in its normal position.

Upon the camera 20 having an objective lens 21, I have mounted a view finder, generally indicated at 22, which is the subject matter of this invention. It will be noted that since the vertical center line c—c of the view finder negative lens is displaced to the left of the center line a—a of the objective lens 21 of the camera, viewing Fig. 1, the horizontal center line d—d of the view finder negative lens is displaced in a vertical direction, viewing Fig. 1, from lens center line b—b of the objective lens 21.

Therefore, to enable the operator to view the subject being photographed and to see the same picture outline that is covered by the objective lens 21, an adjustment must be made so that when the operator looks through the view finder 22, he actually looks through it at angles which are both horizontally and vertically displaced, instead of looking straight through. These angles of displacement will depend on the distance that the camera is positioned from the object being photographed. Naturally the closer the camera is to the subject being photographed, the greater these angles become, and the further away the camera is from the subject being photographed, the flatter such angles become.

Figure 2:
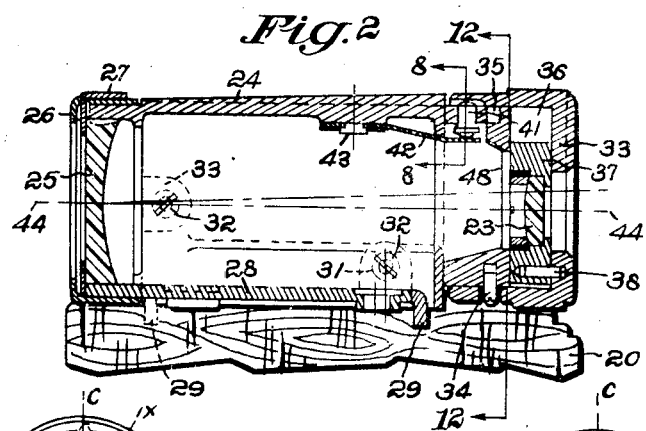
Fig. 2 is a vertical cross section of the view finder, showing the arrangement of the several parts, the lens center both for infinity and six-foot setting distances being indicated.

In order to provide simple and ready means for changing or rectifying these angles, I have devised a new eyepiece for the view finder 22 whereby I can and do cause the positive lens 23 of the view finder 22, as shown in Fig. 2, to be moved along a path indicated by the broken inclined line x—x, Fig. 1. It will be noted that when viewing a subject at infinity, the objective lens 21 of the camera will be centered on lines c—c and d—d, but as the subject being photographed becomes nearer, the positive lens 23 of the view finder 22 will be caused to be moved along the inclined line x—x, that is, in a straight upward direction and also to the left, viewing Fig. 1.

The view finder 22 is made up of a housing or case 24 having the front end (namely, the left-hand end viewing Fig. 2) formed to receive a negative lens 25 which is held in the said housing 24 by means of a bezel 26 provided with an opening into which is fitted a mask 27. The said mask is provided with an opening of the same dimensional ratio as the sensitized material that is being used in the camera, and it is removable to permit the use of lenses of different focal lengths on the camera 20.

The housing or case 24 is provided with a mounting plate 28 having claws 29, 29 that sink into the wood box of the camera 20 when the said mounting plate 28 is screwed down to the camera box by means of screws 30, 30. The said mounting plate 28 is provided with ears 31, 31 into which are threaded screws 32, 32 to hold the housing 24 to the said mounting plate 28.

Fitted to the right-hand end of the housing 24 is a knob-like structure 33 held thereto by means of a pin 34 that slides into a groove 35 formed in the housing 24. The housing 24 is provided with a slotted opening 36, best shown in Figs. 2 and 12, and into the said slotted opening 36 is fitted a lens block 37 that carries the positive lens 23 previously referred to.

The lens block 37 is provided with a pin 38 that engages a spiral cam 39 machined into or formed upon the inner face of the knob 33, best shown in Fig. 11. As the knob 33 is turned, the lens block 37 is caused to be moved in the slotted opening 36 and along the line x—x marked on Figs. 1, 3, 4, 7, 9 and 12. The knob 33 is provided with indentations or notches 40, 40, Figs. 6, 11 and 12, that are engaged by a detent 41, Figs. 2 and 8, thrust in an outward direction by means of a spring 42 held to the view finder housing 24 by a rivet 43.

It will be noted that as the knob 33 is turned any one of the indentations 40 thereof will be engaged by the detent 41 and that the block 37 will be shifted along the line x—x previously referred to, thus changing the position of the positive lens 23 with respect to the vertical and horizontal center lines of the view finder negative lens 25. The said knob 33 is provided with a suitably marked index, shown developed in Fig. 5, being in this case graduated for six feet, eight feet, fifteen feet and infinity, and for each of these positions or distances an indentation 40 is provided. The relationship of the indentations 40 with respect to cam path 39 is best shown in Fig. 11.

In Fig. 2 a horizontal line is shown at 44 which represents the position of the positive lens 23 when the knob 33 is set for the infinity position, as shown in Fig. 10 wherein the infinity mark 45 lines up with the index line 46. The position just described is also indicated in Fig. 7, it being a rear view of the view finder 22 when set in the infinity position.

Figure 3:
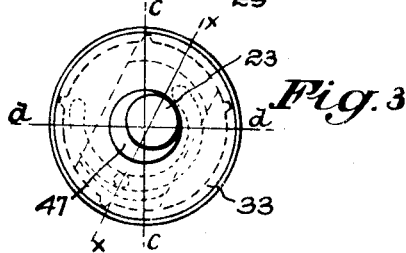
Fig. 3 is a right-hand end view of the adjusting member of the view finder shown in Fig. 2, the view finder being set for a fifteen-foot correction.
Figure 4:
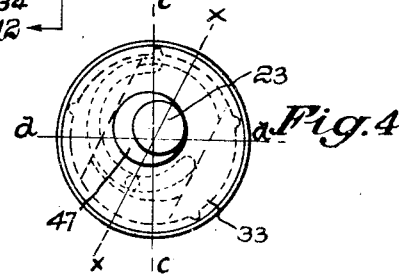
Fig. 4 is a view similar to Fig. 3, the view finder being adjusted for an eight-foot correction.
Figure 5:
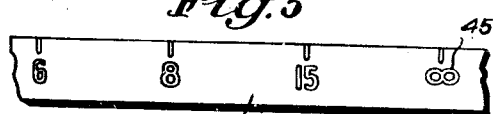
Fig. 5 is a developed view of the scale engraved on the view finder adjusting member.

In Fig. 3, which is a rear view of the knob 33 set to the fifteen-foot position, the distance numeral 15 on the scale 33a, shown in Fig. 5, will line up with the index plate 46. In Fig. 4 the knob 33 is set for the eight-foot position wherein the distance numeral 8 will line up with the index line 46 of Fig. 10. In Fig. 9, the knob 33 is set for the six-foot position and the distance numeral 6 will line up with the index line 46.

In each of these positions just referred to, the detent 41 will engage a corresponding indentation 40 of the knob 33 to hold said knob in a fixed position.

The knob 33 is provided with a substantially central opening 47, Figs. 3, 4, 7, 9 and 11, that is large enough to allow the positive lens 23 to be viewed at all times regardless of the position of the lens block 37. The view finder housing 24 is also provided with an axial opening 48 to permit an unobstructed view through the positive lens 23 regardless of the position of the lens carrying block 37. Since the lens block 37 always travels on a line indicated in Fig. 1 as x—x, which intersects the camera objective lens and the axial center of the viewing lens, any adjustment made by the knob 33 will so position the positive lens 23 as to cause a line of sight through the view finder to bisect a line drawn through the viewing lens axis at a distance indicated on the knob scale 33a, thus providing ready means for correcting the view finder so that the image seen in the view finder will correspond to the image formed at the focal plane of the camera and will assure the operator of always photographing what he sees in the view finder. The lens block 37, as shown in Fig. 6, has two straight parallel edges or sides 37a, 37b, and two preferably curved ends 37c, 37d. The said straight edges or sides 37a, 37b fit and slide in the slotted opening 36 of the housing 24.

The view finder is of simple construction and can be manufactured at a low cost. Nevertheless a high degree of precision is maintained by it.

This invention constitutes a marked improvement upon the construction shown in the patent to De Bisschop No. 2,232,440, February 18, 1941, wherein is provided a view finder similarly mounted upon a camera in the same position as my view finder is mounted and which is also of the reversed Galilean type, being provided with a negative lens fixed in position and a positive lens also fixed in position. An eye-piece is rotatably mounted upon the rear end of the view finder so as to overlie the positive lens, and it is provided with a slight-hole which is off-center with respect to the center line of the eye-piece. In the use of the De Bisschop view finder the line of view through the view finder is changed without moving the view finder and without moving either lens of the view finder. This is accomplished by turning the eye-piece with its off-center sight-hole, so that the sight-hole will for each of the selected distances have a position close to but not corresponding exactly with the center or axial line of the positive lens of the view finder.

In my construction the positive lens of the view finder is moved accurately along a line that intersects the center of the positive lens of the view finder and the center of the objective lens of the camera, thus accurately correcting for parallax.

It will be observed, viewing Figs. 3, 4, 7, 9 and 12, that the parallel side walls of the slotted opening 36 in the housing 24 are parallel with the line x—x that intersects the center of the positive viewing lens of the view finder and the center of the objective lens of the camera. Thus, the lens block 37 is compelled, when moved by rotative adjusting movement of the knob 33, to move along the said line x—x.

Having thus described one illustrative embodi- ment of the invention, it is to be understood that although specific terms are employed, they are used in a generic and descriptive sense and not for purposes of limitation, the scope of the invention being set forth in the following claims.

I claim:

1. A view finder assembly for a photographic camera entirely structurally distinct from and, in use, physically non-connected with the mount of the objective camera lens of such camera, said view finder assembly comprising an elongated, substantially-cylindrical housing having means for attaching it in a fixed, unvarying position to the top of the camera body at one side of a vertical, central line extending through the vertical center of the objective lens of the camera, the said view-finder housing having at the end thereof that is the front end when the housing is secured in functioning position upon the top of the camera body, a stationary negative lens, and having at its opposite or rear end an axial opening, the axial center of which is in line with the axial line of said negative lens, a tubular knob having a cylindrical wall overlapping and received in a sleeve-like relation for rotative adjustment upon said rear end of the said housing and having an outer end wall extending normal to said cylindrical wall and provided with a substantially central viewing opening, the end of the said housing whereon is rotatably received said tubular knob having a slotted opening provided with parallel side walls that are parallel to a line that intersects, when the view finder is in functioning position, an inclined line intersecting the longitudinal axis of said view finder and the longitudinal axis of the objective lens, a lens block having parallel side walls received for guided sliding lengthwise movement in said slotted opening, a positive lens remote from said negative lens and received in said lens block having parallel side edges received against and guided by the side walls of said slotted opening, and cooperating interengaging formations upon said lens block and said tubular knob for moving said lens block along said slotted opening by turning movement of said tubular knob.

2. A view finder in accordance with claim 1, but wherein the said cooperating interengaging formations upon the lens block and the tubular knob comprise a spiral cam groove upon the inner face of said tubular knob and a projecting pin upon said lens block.

3. A view finder in accordance with claim 1, but wherein the inner face of said knob is provided with a series of circumferentially spaced notches placed in accordance with different distances from the object to be photographed, and a detent mounted in the adjacent end of the said housing to engage any one of said notches upon turning movement of said tubular knob and thereby hold said knob in adjusted position.

4. A view finder in accordance with claim 1 but wherein the inner face of said knob is provided with a series of circumferentially spaced notches placed in accordance with different distances from the object to be photographed, and a spring pressed detent mounted in a radial opening in the adjacent end of said housing to engage any one of said notches upon turning movement of said tubular knob and thereby to hold said knob in adjusted position.

5. A view finder assembly for a photographic camera structurally entirely distinct from but adapted to be affixed to the camera body, and in use physically non-connected with the mount of the objective lens of such camera, said view finder assembly consisting of an elongated, substantially cylindrical housing having means for attaching it in a fixed, unvarying, immovable position on the top of the camera body materially to one side of a vertical plane extending lengthwise through the longitudinal axis of the objective lens of the camera, and markedly above the said objective lens of the camera, the said view finder having a stationary but removable lens at the end thereof that is its front end when the housing is secured in functioning position upon the top of the camera body, and having at its opposite or rear end an axial opening, the axial center whereof is in line with the axis of the said stationary lens of the view finder, a tubular knob having a sleeve-like cylindrical wall received in an overlapping relation upon said rear end of the said housing, so as to be arcuately turnable thereon, the said knob having an outer end wall extending normal to the said sleeve-like cylindrical wall thereof and provided with a substantially central viewing opening, the end of the said housing wherein the said tubular knob is received having an elongated slotted opening, the side walls whereof are parallel to each other and are also parallel to a straight inclined line that, when the view finder is in its said fixed position on the top of the camera body, intersects the longitudinal axis of the said view finder and also the longitudinal axis of the objective lens of the camera, a lens block having parallel side walls received for guided, sliding, lengthwise movement along the said parallel walls of the said slotted opening in said housing, a lens contrasting in character with that at the other end of the housing so as to provide therewith a simple reversed Galilean telescope received in said lens block, a pin projecting from said lens block, and a cam upon the inner face of said cylindrical wall of said knob and engaging said pin, arcuately spaced formations upon the inner face of the said cylindrical wall of the knob and a spring detent upon the adjacent portion of the inner cylindrical wall of said housing to engage any one of said spaced formations in the turning movement of said knob.

CLAUDE B. McCATHRON.

REFERENCES CITED

The following references are of record in the file of this patent:

UNITED STATES PATENTS

| Number | Name | Date |
|---|---|---|
| 1,088,137 | Fidjeland | Feb. 24, 1914 |
| 1,169,699 | Wahlenmaier | Jan. 25, 1916 |
| 1,583,706 | Tessier | May 4, 1926 |
| 2,010,268 | Kuppenbender | Aug. 6, 1935 |
| 2,105,256 | Mihalyi | Jan. 11, 1938 |
| 2,191,027 | Ort | Feb. 20, 1940 |
| 2,232,440 | De Bisschop | Feb. 18, 1941 |
| 2,302,584 | Steiner | Nov. 17, 1942 |
| 2,322,399 | Sperry et al. | June 22, 1943 |
| 2,353,227 | Drotning | July 11, 1944 |
| 2,377,821 | Sperry et al. | June 5, 1945 |

FOREIGN PATENTS

| Number | Country | Date |
|---|---|---|
| 22,767 | Norway | Nov. 11, 1912 |